US006373397B1

United States Patent
Song

(10) Patent No.: US 6,373,397 B1
(45) Date of Patent: Apr. 16, 2002

(54) APPARATUS AND METHOD FOR CONTROLLING BACK LIGHT IN MOBILE TELECOMMUNICATION TERMINAL

(75) Inventor: Byeong Seob Song, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/528,437

(22) Filed: Mar. 17, 2000

(30) Foreign Application Priority Data

Mar. 18, 1999 (KR) ................................. 99/9247

(51) Int. Cl.[7] ................................. G08B 5/00
(52) U.S. Cl. ................ 340/815.4; 455/90; 455/575; 379/379; 379/433
(58) Field of Search .................. 340/815.4, 686.1, 340/660; 455/90, 575; 379/433

(56) References Cited

U.S. PATENT DOCUMENTS 5,175,759 A * 12/1992 Metrokka et al. .............. 379/63
5,493,690 A * 2/1996 Shimazaki .................... 379/63
5,710,576 A * 1/1998 Nishiyama et al. ......... 345/169
5,884,185 A * 3/1999 Kim ........................... 455/550
5,918,188 A * 6/1999 Doran ......................... 455/575

FOREIGN PATENT DOCUMENTS

JP         9-62198 A    *  3/1997

* cited by examiner

Primary Examiner—Julie Lieu
(74) Attorney, Agent, or Firm—Fleshner & Kim, LLP

(57) ABSTRACT

An apparatus and method for controlling a back light in a mobile terminal is provided, in which a first back light of a liquid crystal display and a second back light of a key pad are independently controlled. The first and second back lights are driven if a flip cover is opened, while the first back light is only driven if the function selection key is input. Since the second back is not driven when the function selection key is input, unnecessary power consumption can be reduced.

20 Claims, 5 Drawing Sheets

APPARATUS AND METHOD FOR CONTROLLING BACK LIGHT IN MOBILE TELECOMMUNICATION TERMINAL

BACKGROUND OF THE INVENTION

1. Field of the Invention

The present invention relates to a mobile telecommunication terminal, and more particularly, to an apparatus and method for controlling back lights in a liquid crystal display and a key pad for use in a mobile terminal.

2. Description of the Related Art

Recently, a portable personal telecommunication terminal is being commercially spread, which not only transmits input/output data with a microprocessor and a RAM without any assistance from a host computer, but also checks data, manages one's schedule, and performs an electronic diary function under the control of its own program.

Such a portable personal telecommunication terminal includes a liquid crystal display for displaying more data, a key pad for inputting character and numeral data, and a flip cover for covering the liquid crystal display device and the key pad from external pollution sources.

With multi-functions of the portable personal telecommunication terminal, a function selection key is provided on either an outer side of the flip cover or a predetermined area of a main body not covered with the flip cover, so that telecommunication and a simple function can be performed and information can be input in even case that the flip cover is not open.

To facilitate use of the terminal at a dark place, a back light is provided at the rear of the key pad and the liquid crystal display. A light source is provided in the back light by a plurality of light-emitting diodes(LEDs).

An apparatus and method for controlling the back light in the aforementioned related art flip type mobile terminal will be described with reference to the accompanying drawings.

FIG. 1 is a block diagram showing a related art flip type mobile terminal and FIG. 2 is a flow chart showing a method for controlling a back light of the related art flip type mobile terminal.

As shown in FIG. 1, the related art flip type mobile terminal includes a liquid crystal display 30 for displaying data and information, a key pad 50 provided in a main body, for inputting character and numeral data, a flip switch 10 for detecting open and close state of a flip cover, first and second back lights 40 and 60 for providing a back light to the liquid crystal display 30 and the key pad 50, respectively, a function selection key 70 provided on an outer side of the flip cover or a predetermined area of the main body not covered with the flip cover, for selecting various functions in even case that the flip cover is not open, and a central processing unit (CPU) 20 for controlling the overall system of the mobile terminal and simultaneously driving the first and second back lights 40 and 60 in accordance with turn-on of the flip switch 10 or an input signal of the function selection key 70. The flip switch 10 is mechanically turned on/off by open and close state of the flip cover.

The method for controlling the back light in the aforementioned related art flip type mobile terminal will now be described with reference to FIG. 2.

As shown in FIG. 2, the CPU determines whether or not the function selection key 70 is turned on by a user (step S1). This is determined in such a manner that a signal selected by the user is applied to the CPU if the user pushes the function selection key 70.

If the function selection key 70 is turned on, the CPU simultaneously drives the first back light 40 of the liquid crystal display 30 and the second back light 60 of the key pad 50 (step S3).

However, if the function selection key is not pushed by the user, the CPU does not drive the first and second back lights so that the back lights are maintained turned off (step S4).

Also, the CPU determines whether or not the flip cover is opened by the user, through the flip switch 10 (step S2).

If it is determined that the flip cover is opened, the CPU simultaneously drives the first back light of the liquid crystal display and the second back light of the key pad 50 (step S3).

However, if the user does not open the flip cover, the CPU permits the first back light of the liquid crystal display 30 and the second back light of the key pad 50 to be turned off (step S4)

The back light of the liquid crystal display and the back light of the key pad are simultaneously driven or turned off by the control signal of the CPU.

The aforementioned apparatus and method for controlling a back light in the mobile terminal has several problems.

In even case that the user uses the function selection key formed on the outer side of the flip cover at the state that the flip cover is not open, the back light of the key pad is driven, thereby increasing power consumption. In addition, actual standby time of the mobile terminal is reduced due to unnecessary power consumption.

SUMMARY OF THE INVENTION

Accordingly, the present invention is directed to an apparatus and method for controlling a back light in a mobile terminal that substantially obviates one or more of the problems due to limitations and disadvantages of the related art.

An object of the present invention is to provide an apparatus and method for controlling a back light in a mobile terminal, in which a back light of a liquid crystal display and a back light of a key pad are independently controlled to reduce unnecessary power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for controlling a back light in a mobile terminal according to the present invention includes a flip switch for detecting open and close state of a flip cover, a function selection key for being separately operated regardless of the open and close state of the flip cover, a first back light for supplying a light source to a liquid crystal display, a second back light for supplying a light source to a key pad, and a controller for driving the first and second back lights if the flip cover is opened and driving only the first back light if the function selection key is input.

In the preferred embodiment of the present invention, the controller includes a CPU for outputting a first back light enable signal B/L-EN in accordance with the flip switch and the function selection key, and an AND gate for driving the second back light by performing logic AND operation of the enable signal of the CPU and an output signal of the flip switch. The flip switch includes a first pin for supplying a constant voltage to a main board of the main body and a second pin connected to a ground terminal of the first pin. The flip switch is configured to electrically connect the first and second pins with each other if the flip cover is closed, and the function selection key is configured to electrically connect the first pin with the second pin at different resistance values in accordance with a key selected by a user.

In another aspect, a method for controlling a back light in a mobile terminal including a flip cover, a function selection key, a first back light of a liquid crystal display, and a second back light of a key pad, includes the steps of driving the first and second back lights if the flip cover is opened, and driving only the first back light if the function selection key is input.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1:
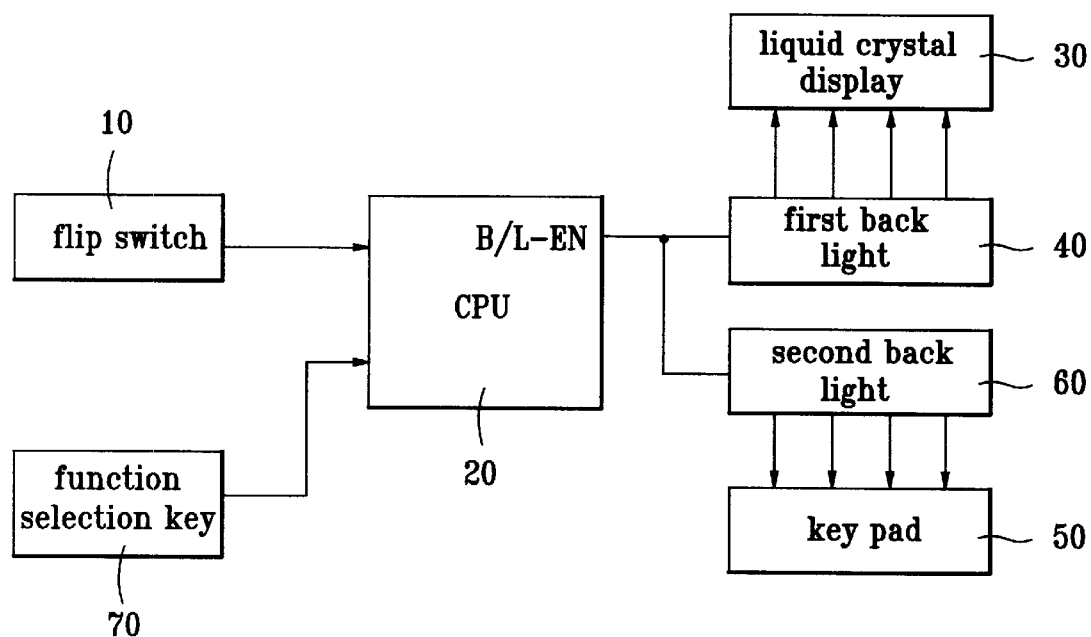
FIG. 1 is a block diagram showing an apparatus for controlling a back light in a related art flip type mobile terminal.
Figure 2:
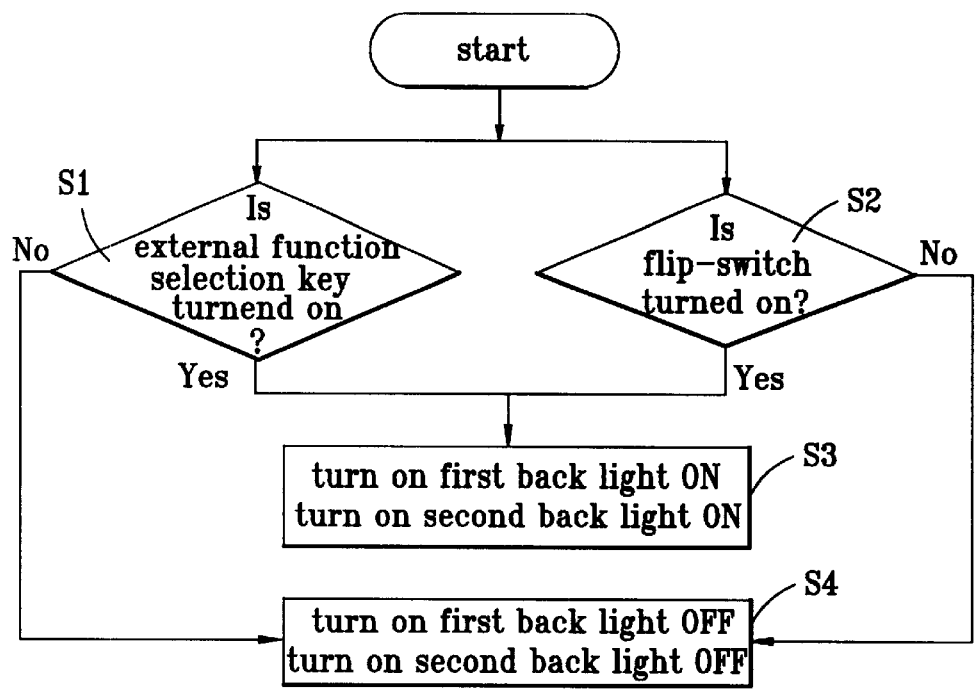
FIG. 2 is a flow chart showing a method for controlling a back light in the related art flip type mobile terminal.
Figure 3:
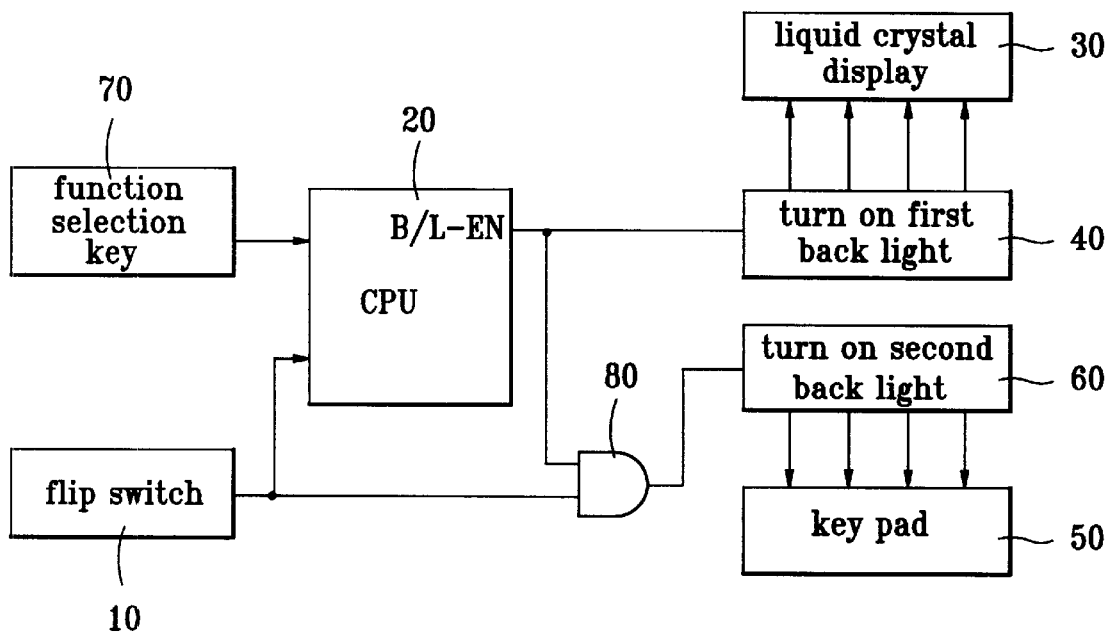
FIG. 3 is a block diagram showing an apparatus for controlling a back light in a mobile terminal according to the first embodiment of the present invention.

As shown in FIG. 3, an apparatus for controlling a back light in a mobile terminal according to the first embodiment of the present invention includes a function selection key 70 provided on either an outer side of a flip cover or a predetermined area of a main body not covered with the flip cover, for directly applying a function selection signal of a user to a CPU, a flip switch 10 for detecting open and close state of the flip cover, a first back light 40 for supplying a light source to a liquid crystal display 30, a second back light 60 for supplying a light source to a key pad 50, a CPU 20 for controlling the overall system of the mobile terminal and outputting an enable signal B/L-EN to the first and second lights 40 and 60- in accordance with the flip switch 10 or a key input signal of the function selection key 70, and an AND gate 80 for driving the second back light 60 by performing logic AND operation of the enable signal B/L-EN of the CPU 20 and an output signal of the flip switch 10.

The flip switch 10 is mechanically turned on/off by open and close state of the flip cover. The first back light 40 is directly controlled by the CPU 20 and the second first back light 60 is controlled by the AND gate 80.

The operation of the aforementioned apparatus for controlling a back light in a mobile terminal according the first embodiment of the present invention will be described below.

It is assumed that if the flip cover is close, the flip switch 10 outputs a low signal, while if the flip cover is open, the flip switch 10 outputs a high signal.

It is also assumed that the user pushes the function selection key 70 at the state that the flip cover is close. At this time, the CPU 20 outputs the enable signal B/L-EN for driving the first and second back lights at high level. Thus, the first back light 40 is turned on. However, the second back light 60 is not operated because the flip switch 10 outputs a low signal and the AND gate 80 also outputs a low signal.

On the contrary, it is assumed that the flip cover is opened by the user. In this case, the CPU 20 outputs the enable signal B/L-EN at high level and the flop switch 10 also outputs a high signal. Thus, the first and second back lights 40 and 60 are driven to be supplied to the liquid crystal display 30 and the key pad 50, respectively.

Of course, the first and second back lights are not driven if the flip cover is close and the function selection key is not input.

As aforementioned, since the apparatus for controlling a back light in a mobile terminal according to the first embodiment of the present invention can further add the AND gate to the related art apparatus for controlling a back light, it is possible to easily upgrade the related art mobile terminal.

Second Embodiment

Figure 4:
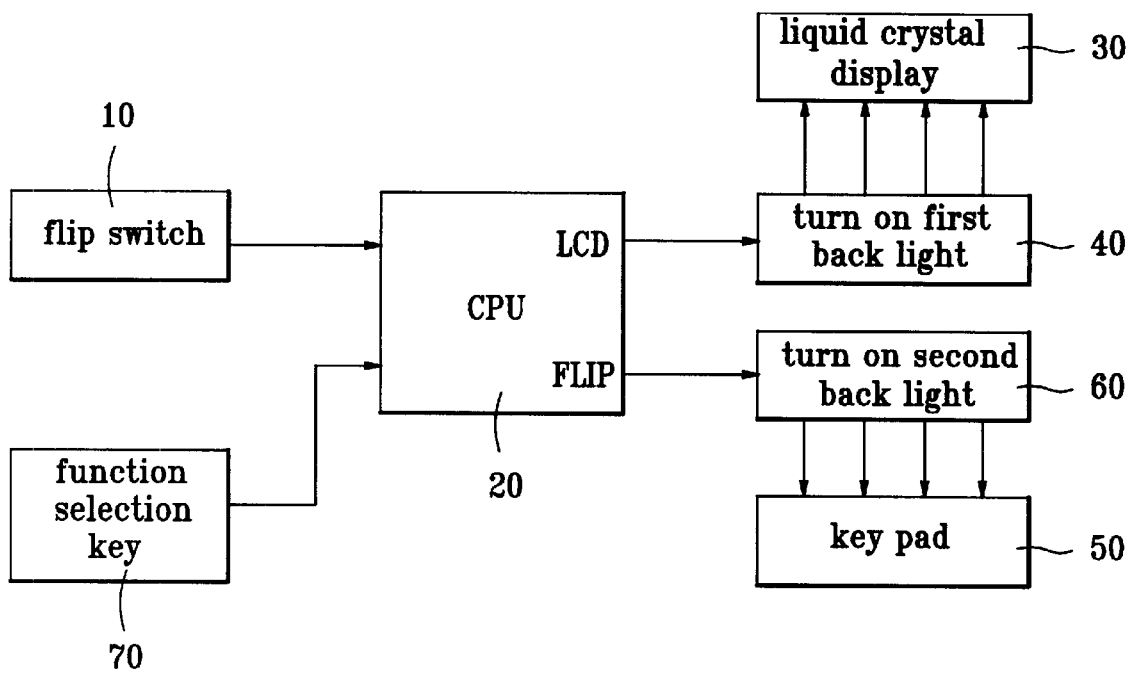
FIG. 4 is a block diagram showing an apparatus for controlling a back light in a mobile terminal according to the second embodiment of the present invention.

FIG. 4 is a block diagram showing an apparatus for controlling a back light in a mobile terminal according to the second embodiment of the present invention.

The apparatus for controlling a back light in a mobile terminal according to the second embodiment of the present invention includes a function selection key 70 provided on either an outer side of a flip cover or a predetermined area of a main body not covered with the flip cover, for directly applying a function selection signal of a user to a CPU, a flip switch 10 for detecting open and close state of the flip cover, a first back light 40 for supplying a light source to a liquid crystal display 30, a second back light 60 for supplying a light source to a key pad 50 formed in the main body, and a CPU 20 for controlling the overall system of the mobile terminal, driving the first and second back lights 40 and 60 if it is detected by the flip switch 10 that the flip cover is opened, and driving only the first back light if the function selection key is input at the state that the flip cover is close.

Unlike the first embodiment, the CPU 20 of the second embodiment separately outputs a driving signal of the first back light 40 and a driving signal of the second back light 60.

The operation of the aforementioned apparatus for controlling a back light in a mobile terminal according to the second embodiment of the present invention will be described below.

If the function selection key 70 is input at the state that flip cover is not opened by the user, a control signal LCD for driving the first back light is output at high level. Thus, the first back light is only turned on.

Also, if it is determined by the flip switch 10 that the flip cover is opened, the CPU outputs driving signals LCD and FLIP of the first and second back lights at high levels, so that the first and second back lights 40 and 60 are driven at the same time.

Third Embodiment

Figure 5:
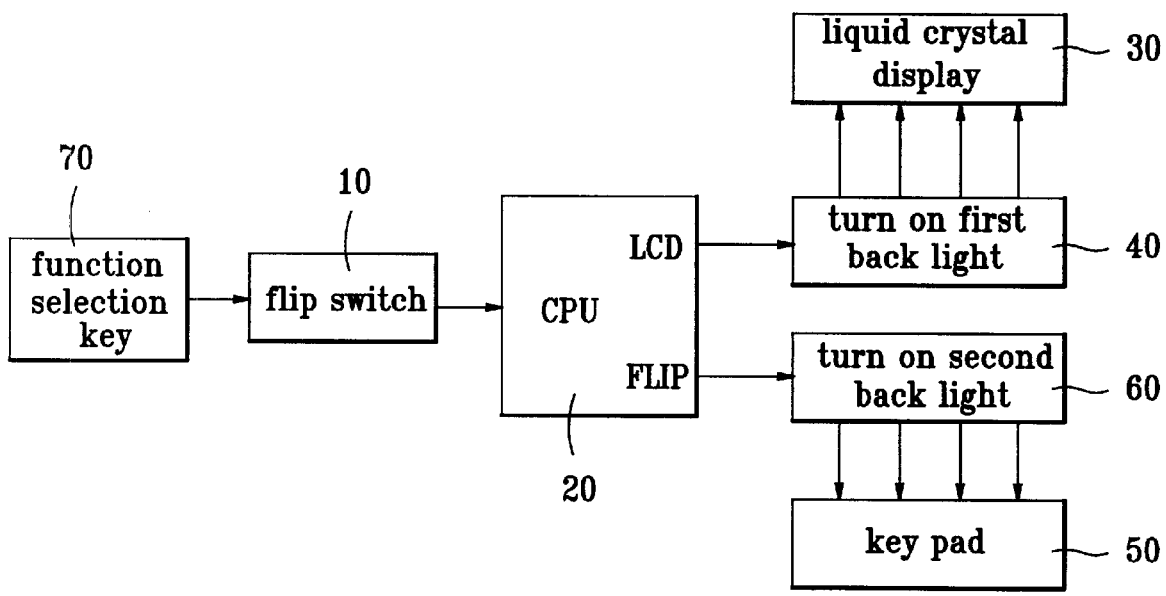
FIG. 5 is a block diagram showing an apparatus for controlling a back light in a mobile terminal according to the third embodiment of the present invention.
Figure 6:
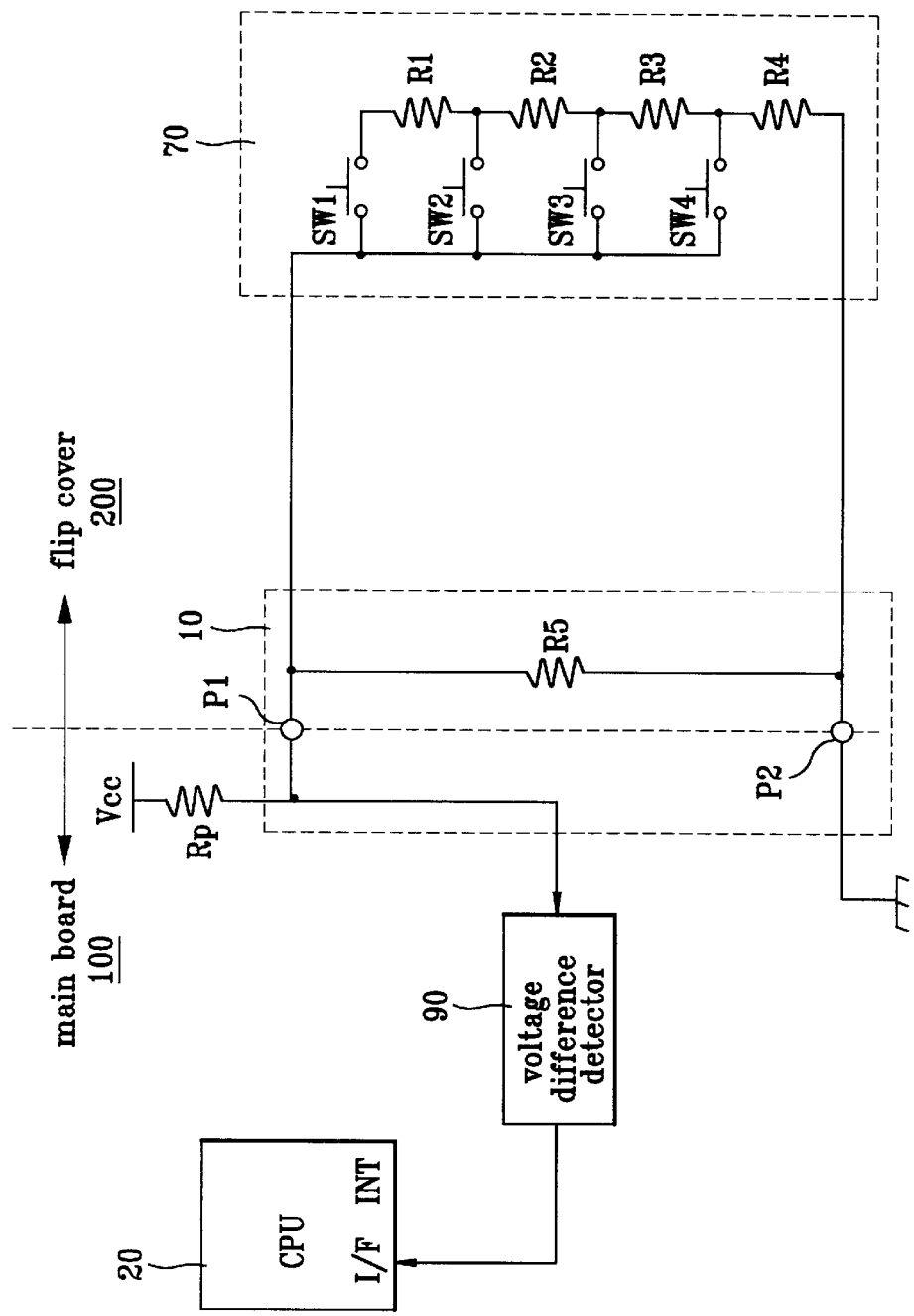
FIG. 6 is a detailed circuit diagram showing a function selection key, a flip switch, and a controller in FIG. 5.

FIG. 5 is a block diagram showing an apparatus for controlling a back light in a mobile terminal according to the third embodiment of the present invention, and FIG. 6 is a circuit diagram of FIG. 5.

The apparatus for controlling a back light in a mobile terminal according to the third embodiment of the present invention includes a function selection key 70 provided on an outer side of a flip cover, a flip switch 10 for applying a key input signal of the function selection key 70 and at the same time detecting open and close state of the flip cover, a first back light 40 for supplying a light source to a liquid crystal display 30, a second back light 60 for supplying a light source to a key pad 50 formed in the main body, and a CPU 20 for controlling the overall system of the mobile terminal and outputting driving signals LCD and FLIP of the first and second back lights 40 and 60 in accordance with the flip switch 10 and the key input signal of the function selection key 70.

The function selection key 70, the flip switch 10, and the CPU 20 will be described in detail with reference to FIG. 6.

The flip switch 10 includes a first pin P1 for transmitting and receiving a signal between a main body 100 and a flip cover 200 and a second pin P2 connected with a ground terminal of the first pin P1, so that open and close state of the flip cover 200 can be detected and the key input signal of the function selection key 7 can be transmitted to the CPU 20. The function selection key 70 is configured to output a voltage corresponding to a constant voltage applied through the first pin P1 to the ground terminal through the second pin P2 so that a voltage difference can be generated. As above, the voltage difference is generated in accordance with the state of the flip switch 10 and the function selection key 70. A voltage difference detector 90 is further provided to detect the voltage difference and transmit it to the CPU 20.

The operation of the apparatus for controlling a back light in a mobile terminal according the third embodiment is the same as that of the second embodiment except for the operation of the function selection key and the flip switch.

That is to say, if the flip cover 200 is close, the function selection key 70 is electrically connected with the CPU 20 by the first and second pins P1 and P2. At this time, if no key input signal is selected by the user from the function selection key 70, the constant voltage applied to the first pin P1 is grounded through a resistor R5. Therefore, the voltage difference detector 90 detects a voltage difference and applies the detected voltage difference to the CPU 20. As a result, the CPU 20 determines that the flip cover is close.

At the state that the flip cover is close, if any switch of the function selection key 70 is turned on, two separate voltage paths are respectively formed in the flip switch 10 and the function selection key 70 in accordance with turn-on of the resistor R5 and the function selection key 70, thereby generating a higher voltage difference. Thus, it is possible to determine which switch of the function selection key is turned on in accordance with the voltage difference.

In other words, if the flip cover is open, the voltage difference is not generated. At the state that the flip cover is close, if the function selection key is not selected, a voltage difference of R5/(Rp+R5)Vcc is generated. If any switch is selected from the function selection key, the two voltage paths are formed. Thus, the CPU 20 can determine whether or not the flip cover is open.

Also, at the state that the flip cover is close, if the function selection key is turned on, resistance values corresponding to respective keys of the function selection key are different, respectively. Therefore, the CPU 20 tables values corresponding to the respective keys so that the input value from the voltage difference detector 90 is compared with the tabled values to recognize the selected function.

In other words, in the third embodiment of the present invention, the CPU compares the voltage of the voltage difference detector 90 with first and second reference voltages. Thus, if the voltage of the voltage difference detector 90 is lower than the first reference voltage and higher than the second reference voltage, the CPU determines that the flip cover is close. If the voltage of the voltage difference detector 90 is lower than the second reference voltage, the CPU determines that the function selection key is input.

Figure 7:
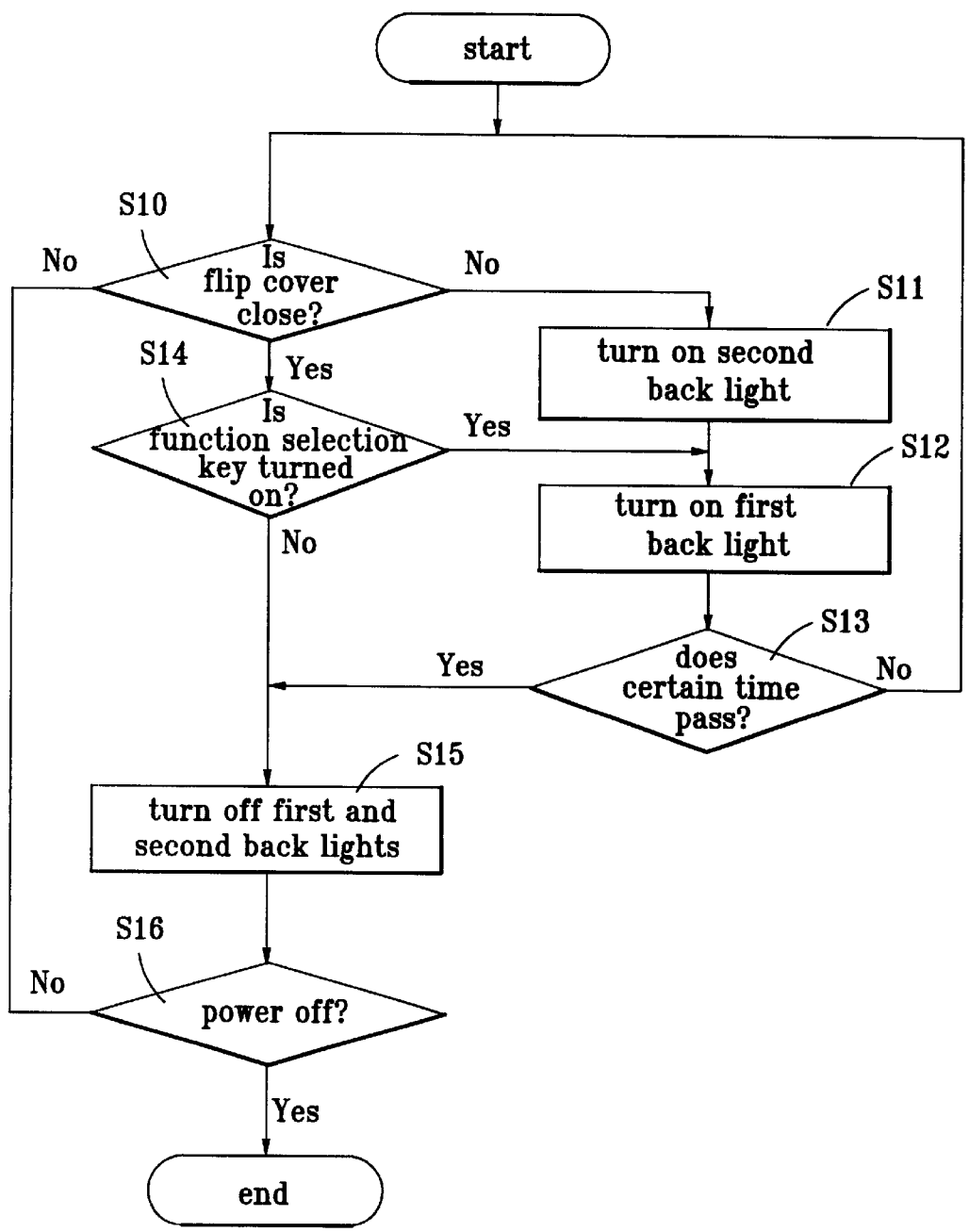
FIG. 7 is a flow chart showing a method for controlling a back light in a mobile terminal according to the present invention.

FIG. 7 is a flow chart showing a method for controlling a back light in a mobile terminal according to the present invention.

The CPU 20 determines the state (close/open state) of the flip cover 200 through the flip switch 10 (step S10).

If the flip cover is open, the first and second back lights are all driven (steps S11 and S12) so that the first and second back lights are turned on for a certain time (step S13).

If the flip cover 200 is close, it is determined whether the function selection key signal is input (step S15). At the state that the flip cover 200 is close, if the function selection key 70 is input, the first back light of the liquid crystal display is only turned on for a certain time (step S12).

If the flip cover 200 is close and the function selection key is not input, the first and second back lights are all turned off (step S15).

As aforementioned, the apparatus and method for controlling a back light in a mobile terminal according to the present invention has the following advantages.

At the state that the flip cover is open, the data is input using the key pad formed in the main body. Therefore, the back light is supplied to both the liquid crystal display and the key pad. At the state that the flip cover is close, the key pad is not used. Therefore, the back light is not supplied to the key pad even though the function selection key is input. As a result, unnecessary power consumption can be avoided, thereby increasing actual standby time or use time of the mobile terminal for one time charge.

It will be apparent to those skilled in the art that various modifications and variations can be made in the apparatus and method for controlling a back light in a mobile terminal according to the present invention without departing from the spirit or scope of the invention. Thus, it is intended that the present invention covers the modifications and variations of the invention provided they come within the scope of the appended claims and their equivalents.

What is claimed is:

1. An apparatus for controlling back lighting in a mobile terminal comprising:

a flip switch for detecting at least one of open and closed states of a flip cover;

a function selection key separately operated regardless of the open and closed states of the flip cover, wherein the function selection key is provided on the mobile terminal for applying a key input signal to the controller through the flip switch and, wherein the function select key is provided on an outer side of the flip cover;

a first back light for supplying a light source to a liquid crystal display;

a second back light for supplying a light source to a key pad; and a controller for driving the first and second back lights if the flip cover is opened and driving the first back light and not driving the second back light if the function selection key is input, wherein the flip switch includes a first pin for supplying a constant voltage to a main board of the main body and a second pin connected to a ground terminal of the first pin, and the flip switch is configured to electrically connect the first and second pins with each other if the flip cover is closed and the function selection key is configured to electrically connect the first pin with the second pin at different resistance values in accordance with a key selected by a user.

2. The apparatus of claim 1, wherein the controller includes a CPU for outputting a first back light enable signal in accordance with the flip switch and the function selection key, and an AND gate for driving the second back light by performing logic AND operation of the enable signal of the CPU and an output signal of the flip switch.

3. The apparatus of claim 1, wherein the controller includes a voltage difference detector for detecting an input voltage through the flip switch, and a CPU for comparing the voltage of the voltage difference detector with first and second reference voltages so that it is determined that the flip cover is closed if the voltage of the voltage difference detector is lower than the first reference voltage and higher than the second reference voltage, and it is determined that the function selection key is input if the voltage of the voltage difference detector is lower than the second reference voltage.

4. The apparatus of claim 1, wherein the function selection key is input, the flip cover is closed and the controller drives the first back light and not the second back light.

5. An apparatus for controlling back lighting in a mobile terminal, comprising:

a flip switch that detects at least one of open and closed states of a flip cover;

a function selection key separately operated regardless of the open and closed states of the flip cover;

a first back light that supplies a light source to a liquid crystal display;

a second back light that supplies a light source to a key pad; and a controller that drives the first and second back lights if the flip cover is opened and that drives the first back light and does not drive the second back light if the function selection key is input, and wherein the function selection key is provided on the mobile terminal, for applying a key input signal to the controller through the flip switch, wherein the flip switch includes a first pin for supplying a constant voltage to a main board of the main body and a second pin connected to a ground terminal of the first pin, and the flip switch is configured to electrically connect the first and second pins with each other if the flip cover is closed and the function selection key is configured to electrically connect the first pin with the second pin at different resistance values in accordance with a key selected by a user.

6. The apparatus of claim 5, wherein the controller includes a voltage difference detector for detecting an input voltage through the flip switch, and a CPU for comparing the voltage of the voltage difference detector with first and second reference voltages so that it is determined that the flip cover is close if the voltage of the voltage difference detector is lower than the first reference voltage and higher than the second reference voltage, and it is determined that the function selection key is input if the voltage of the voltage difference detector is lower than the second reference voltage.

7. An apparatus for controlling back lighting in a mobile terminal comprising:

a flip switch for detecting at least one of open and closed states of a flip cover;

a function selection key separately operated regardless of the open and closed states of the flip cover, wherein the function selection key is provided on the mobile terminal for applying a key input signal to the controller through the flip switch and, wherein the function select key is provided on an outer side of the flip cover;

a first back light for supplying a light source to a liquid crystal display;

a second back light for supplying a light source to a key pad; and a controller for driving the first and second back lights if the flip cover is opened and driving the first back light and not driving the second back light if the function selection key is input, wherein the controller includes a voltage difference detector for detecting an input voltage through the flip switch, and a CPU for comparing the voltage of the voltage difference detector with first and second reference voltages so that it is determined that the flip cover is closed if the voltage of the voltage difference detector is lower than the first reference voltage and higher than the second reference voltage, and it is determined that the function selection key is input if the voltage of the voltage difference detector is lower than the second reference voltage.

8. The apparatus of claim 7, wherein the controller includes a CPU for outputting a first back light enable signal in accordance with the flip switch and the function selection key, and an AND gate for driving the second back light by performing logic AND operation of the enable signal of the CPU and an output signal of the flip switch.

9. The apparatus of claim 7, wherein the flip switch includes a first pin for supplying a constant voltage to a main board of the main body and a second pin connected to a ground terminal of the first pin, and the flip switch is configured to electrically connect the first and second pins with each other if the flip cover is closed and the function selection key is configured to electrically connect the first pin with the second pin at different resistance values in accordance with a key selected by a user.

10. The apparatus of claim 7, wherein the function selection key is input, the flip cover is closed and the controller drives the first back light and not the second back light.

11. An apparatus for controlling back lighting in a mobile terminal, comprising:

a flip switch that detects at least one of open and closed states of a flip cover;

a function selection key separately operated regardless of the open and closed states of the flip cover;

a first back light that supplies a light source to a liquid crystal display;

a second back light that supplies a light source to a key pad; and a controller that drives the first and second back lights if the flip cover is opened and that drives the first back light and does not drive the second back light if the function selection key is input, and wherein the function selection key is provided on the mobile terminal, for applying a key input signal to the controller through the flip switch, wherein the controller includes a voltage difference detector for detecting an input voltage through the flip switch, and a CPU for comparing the voltage of the voltage difference detector with first and second reference voltages so that it is determined that the flip cover is closed if the voltage of the voltage difference detector is lower than the first reference voltage and higher than the second reference voltage, and it is determined that the function selection key is input if the voltage of the voltage difference detector is lower than the second reference voltage.

12. The apparatus of claim 11, wherein the flip switch includes a first pin for supplying a constant voltage to a main board of the main body and a second pin connected to aground terminal of the first pin, and the flip switch is configured to electrically connect the first and second pins with each other if the flip cover is closed and the function selection key is configured to electrically connect the first pin with the second pin at different resistance values in accordance with a key selected by a user.

13. An apparatus for controlling back lighting in a mobile terminal comprising:
   a flip switch for detecting at least one of open and closed states of a flip cover;
   a function selection key separately operated regardless of the open and closed states of the flip cover;
   a first back light for supplying a light source to a liquid crystal display;
   a second back light for supplying a light source to a key pad; and
   a controller for driving the first and second back lights if the flip cover is opened and driving the first back light if the function selection key is input, wherein the flip switch includes a first pin for supplying a constant voltage to a main board of the main body and a second pin connected to a ground terminal of the first pin, and the flip switch is configured to electrically connect the first and second pins with each other if the flip cover is closed and the function selection key is configured to electrically connect the first pin with the second pin at different resistance values in accordance with a key selected by a user.

14. The apparatus of claim 13, wherein the controller includes a CPU for outputting a first back light enable signal in accordance with the flip switch and the function selection key, and an AND gate for driving the second back light by performing logic AND operation of the enable signal of the CPU and an output signal of the flip switch.

15. The apparatus of claim 13, wherein the controller includes a voltage difference detector for detecting an input voltage through the flip switch, and a CPU for comparing the voltage of the voltage difference detector with first and second reference voltages so that it is determined that the flip cover is closed if the voltage of the voltage difference detector is lower than the first reference voltage and higher than the second reference voltage, and it is determined that the function selection key is input if the voltage of the voltage difference detector is lower than the second reference voltage.

16. The apparatus of claim 13, wherein the function selection key is input, the flip cover is closed and the controller drives the first back light and not the second back light.

17. An apparatus for controlling back lighting in a mobile terminal comprising:
   a flip switch for detecting at least one of open and closed states of a flip cover;
   a function selection key separately operated regardless of the open and closed states of the flip cover;
   a first back light for supplying a light source to a liquid crystal display;
   a second back light for supplying a light source to a key pad; and
   a controller for driving the first and second back lights if the flip cover is opened and driving the first back light if the function selection key is input, wherein the controller includes a voltage difference detector for detecting an input voltage through the flip switch, and a CPU for comparing the voltage of the voltage difference detector with first and second reference voltages so that it is determined that the flip cover is closed if the voltage of the voltage difference detector is lower than the first reference voltage and higher than the second reference voltage, and it is determined that the function selection key is input if the voltage of the voltage difference detector is lower than the second reference voltage.

18. The apparatus of claim 17, wherein the controller includes a CPU for outputting a first back light enable signal in accordance with the flip switch and the function selection key, and an AND gate for driving the second back light by performing logic AND operation of the enable signal of the CPU and an output signal of the flip switch.

19. The apparatus of claim 17, wherein the flip switch includes a first pin for supplying a constant voltage to a main board of the main body and a second pin connected to a ground terminal of the first pin, and the flip switch is configured to electrically connect the first and second pins with each other if the flip cover is closed and the function selection key is configured to electrically connect the first pin with the second pin at different resistance values in accordance with a key selected by a user.

20. The apparatus of claim 17, wherein the function selection key is input, the flip cover is closed and the controller drives the first back light and not the second back light.

* * * * *